United States Patent Office 3,128,385
Patented Apr. 7, 1964

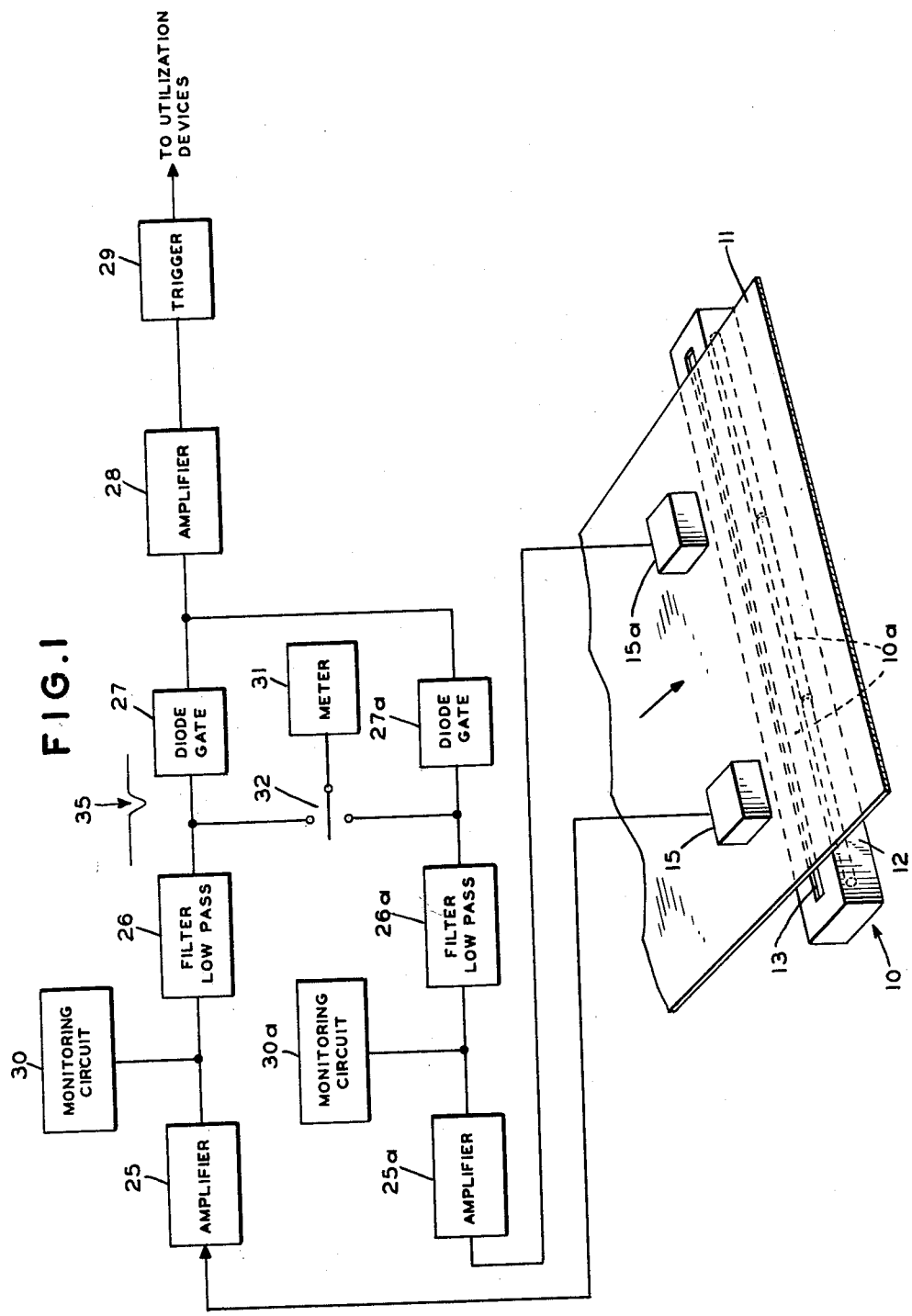

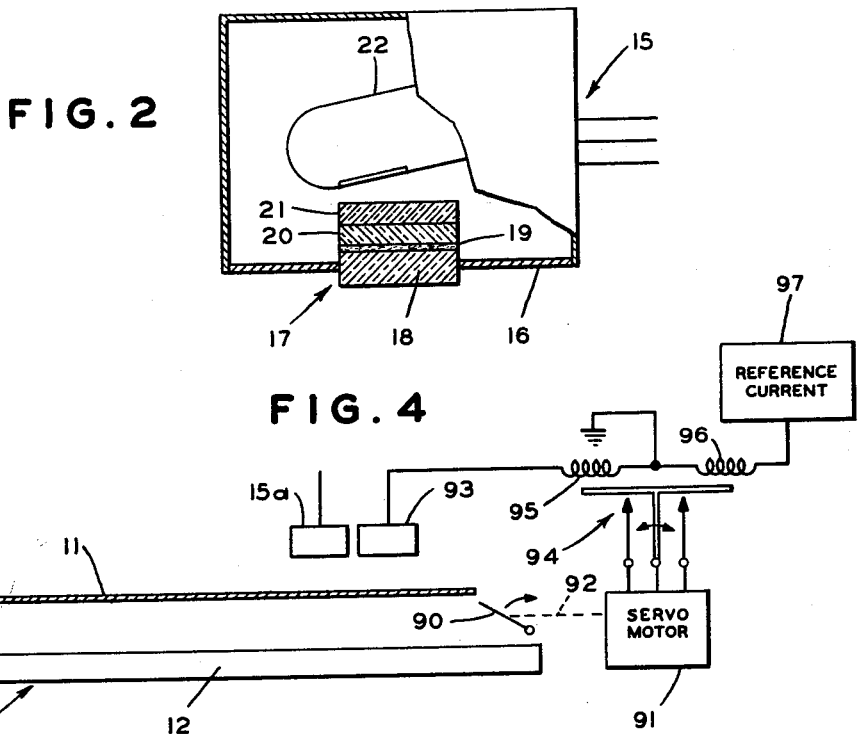
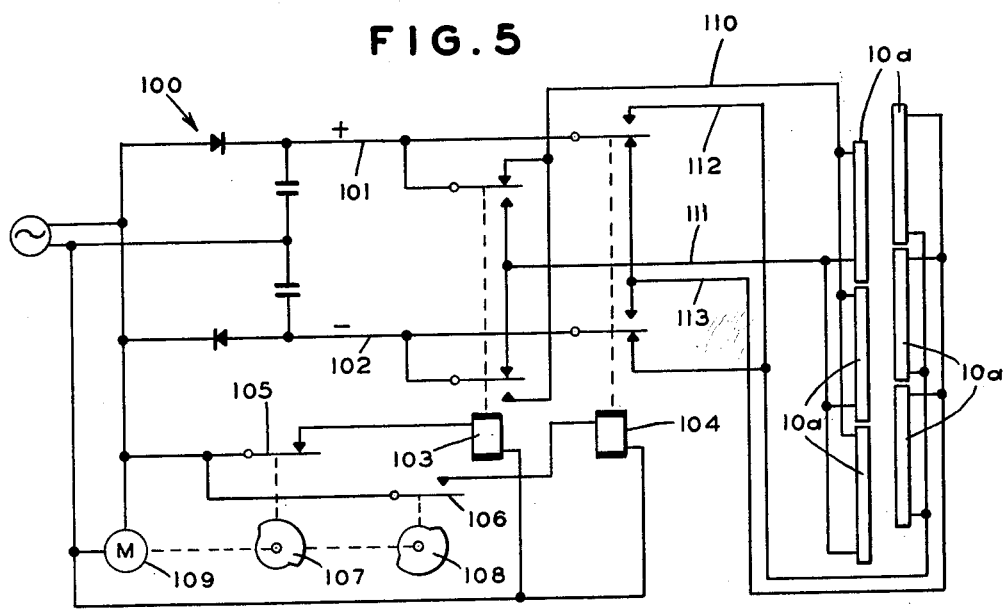

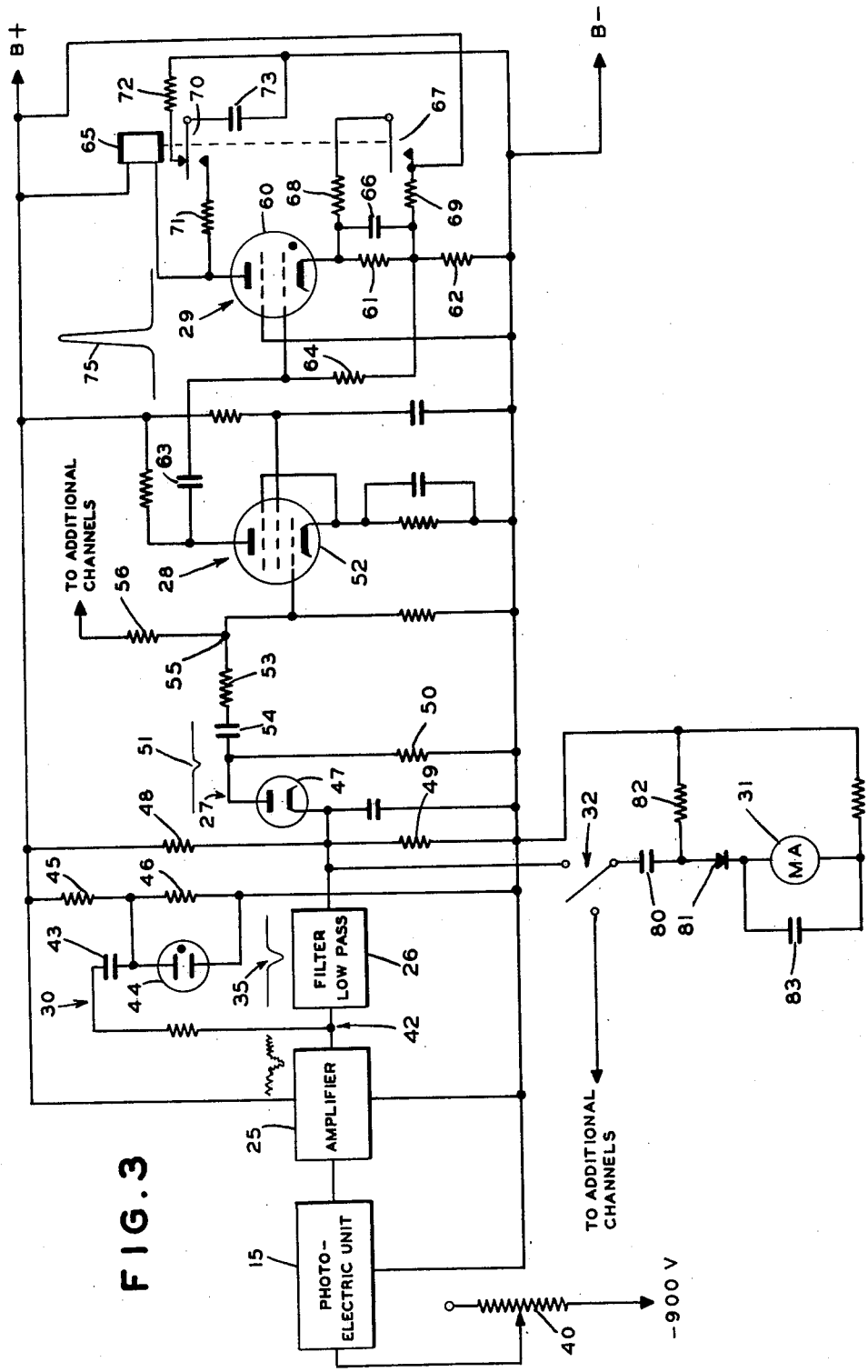

3,128,385
PHOTOSENSITIVE HOLE DETECTOR USING
PHOSPHOR RADIATION SOURCE
Erich Scharf, Massapequa Park, and Jack Fajans,
Douglaston, N.Y., assignors, by mesne assignments, to
Cutler-Hammer, Inc., Milwaukee, Wis., a corporation of
Delaware
Filed Feb. 18, 1959, Ser. No. 794,099
9 Claims. (Cl. 250—219)

This invention relates to apparatus for detecting holes and more particularly to a hole detector which is especially well suited for detecting holes in sheet material traveling at a relatively high speed.

Often in the inspection of a product it is necessary to detect holes which may be objectionable even though small in size and this inspection, as a practical matter, can only be carried out while the work is being fed past the inspection station at a high rate of speed. For example, in the manufacture of paper, a relatively wide sheet of paper may travel at about 1000 feet per minute or more between two rollers where it is necessary to insure that the occurrence of holes as small as 1/32 of an inch or smaller is not objectionable. Efforts have hitherto been made to provide detecting apparatus for detecting holes in a moving sheet by flooding one side of the work with light and detecting light which passes through the more or less opaque work by means of a light sensitive device and thereby provide an indication of the presence of holes in the work. Considerable difficulty has been encountered in providing such apparatus which is capable of reliable performance over extended periods of operation.

One problem involves the difficuty of avoiding spurious signals because of variations in the ambient light level. It will be appreciated that the amount of light which reaches the light sensitive device through a hole and to which it must respond may be very small. Consequently, an increase in the ambient light level even by a relatively small amount may cause spurious signals.

In addition, even when the work being inspected is completely opaque to light as in the case of metal there yet remains the problem of distinguishing between unwanted light reflected from the surface of the work and the light which passes through a hole. In the case of paper the problem is aggravated by the fact that in addition to its reflectance most paper dealt with is more or less translucent.

One feature of the present invention relates to the use for illuminating one side of the work of a light source which is rich in ultraviolet radiation with regard to which such paper as newsprint, coated paper and bond paper is highly absorptive. With such an arrangement there is little or no significant amount of ambient radiation at or close to the primary wave length of the source. In view of the absorption of ultraviolet radiation by the paper, the radiation sensitive device may be used to detect holes of such small size as to require a relatively high degree of sensitivity.

A further feature of the present invention relates to the provision of a filter assembly, including a phosphor layer, which is so arranged that transmittance to the phosphor is peaked in the desired ultraviolet portion of the spectrum, and light from the phosphor layer to a light responsive device is confined to a relatively narrow region in the visible spectrum. The filter assembly is mounted so that light or radiation passing through a hole in the work must pass through the filter in order to reach the light responsive device. In this way, the apparatus is for all practical purposes operable without regard to such ambient light conditions as may be normally encountered.

When relatively wide paper sheets are being processed at high speed it is usually difficult if not impossible in practice to keep the paper from drifting laterally. Thus, with the hole detector apparatus fixed in place, lateral movement of the paper if great enough will result in unmasking of the light source and its radiation will fall directly upon the pick-up apparatus. It will be appreciated that it is desired to scan the full width of the paper without leaving any substantial unscanned margins. Yet another feature of this invention relates to the provision of an arrangement for automatically shifting the illuminated or scanned area in step with lateral drifting of the work.

Yet another feature relates to the provision of gating means responsive to relatively small voltage swings about its threshold or bias voltage level which, through a high gain amplifier, switches a bi-stable triggering means from one of its stable states to the other for providing a relatively large current output for operating utilization devices.

Further features, objects and advantages of the present invention will be apparent from the following description of a preferred embodiment thereof shown in the accompanying drawings in which:

FIGURE 1 is a diagrammatic view partially in block form of a hole detector apparatus constructed in accordance with the present invention;

FIGURE 2 is a sectional view through one of the photoelectric units;

FIGURE 3 is a schematic diagram of the control circuit partially in block form;

FIGURE 4 is a diagrammatic view of the shutter mechanism and an arrangement for operating the same; and FIGURE 5 is a diagrammatic view of the lamp switching circuit.

Referring now to the drawings in detail, an ultraviolet light source 10 is shown mounted just below a continuous running sheet 11 only a relatively short length of which is shown in FIGURE 1. While sheet 11 may comprise any material which is sufficiently opaque to radiation of the wave length emitted by lamp 10, in the present instance sheet 11 is paper, such as newsprint, passing at relatively high speed between two rollers (not shown). A source of illumination utilized is such that it provides a substantial amount of radiation having a wave length shorter than visible radiation. It is to be understood that by reference to ultraviolet radiation it is intended to exclude all radiation of a wave length long enough to be visible as well as radiation of a longer wave length. In the present instance, light source 10 preferably includes one or more elongated lamps 10a of the type manufactured and sold commercially as germicidal lamps, about 60% of the radiant energy of which is at a wave length of 2,537 Angstrom units and having clear envelopes. The lamps 10a, as will be more fully pointed out hereinafter, are mounted within an elongated enclosure 12 having an opening in the form of a slot 13 presented toward sheet 11. As indicated, the light source 10 is mounted as close as practical to the surface of sheet 11 so as to illuminate a scanned area which extends across the width of the sheet but is relatively narrow in the direction sheet 11 travels.

Depending upon the width of the sheet material, one or more photoelectric units is mounted to receive light or radiation passing through the sheet. In the present instance two photoelectric units 15 and 15a are shown but it is to be understood that three or more may be used as required by the width of the sheet being inspected in order to insure efficient scanning of the illuminated area. It will be appreciated that the perpendicular distance between each photoelectric unit and the scanned surface of the sheet material 11 affects the amount of radiation passing through the sheet which reaches a photoelectric unit.

In addition, where the thickness of the sheet 11 approximates or is greater than the diameter of the hole size it is desired that the apparatus be responsive to, it will also be appreciated that when a hole is a substantial distance to one side of the nearest photoelectric unit the photoelectric unit will not be able to "see" the light source through the hole.

As shown most clearly in FIGURE 2, in connection with unit 15, the photoelectric units 15 and 15a each comprises a housing 16 having an opening formed in the surface thereof presented towards the material being inspected. A filter assembly 17 is mounted in the opening of the housing 16. Radiation incident upon filter assembly 17 first passes through a filter element 18, the transmittance of which is peaked in the ultraviolet portion of the spectrum and passes a wavelength of 2537 Angstrom units. The inner surface of filter element 18 is provided with a coating 19 of phosphor material and this coating 19 is juxtaposed to a second filter element 20 which is in turn juxtaposed to a third filter element 21 which is presented towards the photocathode electrode of a conventional photomultiplier tube 22. It is apparent therefore that filter assembly 17 comprises a sandwich or stack of a plurality of filter elements between two of which a phosphor coating is interposed. The phosphor coating 19 is formed of commercially available phosphor material having a dsirable response characteristic to ultraviolet radiation. Calcium halophosphate which is used in coating the interior of the envelope of standard fluorescent lamps has proven to be satisfactory in operation. The phosphor is readily laid down on the filter element in the usual way to form the coating. Filter elements 20 and 21 are selected so as to pass radiation emitted by the phosphor in a relatively narrow region of the visible spectrum, and to prevent any light or radiation outside of this region from reaching the photomultiplier tube 22. For this purpose filter element 20 is selected so that its transmittance is sharply peaked in the yellow portion of the spectrum while the transmittance of filter element 21 is peaked in the blue portion of the spectrum. The overlap of the transmittances of filter elements 20 and 21 provides a relatively narrow transmission region for light emitted by the phosphor to pass to photomultiplier tube 22. The combination of initial ultraviolet filtering by element 18, conversion of the ultraviolet light to visible light by the phosphor coating 19, and subsequent filtering by elements 20 and 21 has been found very effective in preventing false actuation of tube 22 by ambient light, while at the same time providing a sensitive detector of ultraviolet radiation passing through holes in the sheet material.

Considering first photoelectric unit 15, as a hole in material 11 passes between light source 10 and photoelectric unit 15, the ultraviolet light from the source 10 passes through filter element 18 and excites the phosphor coating 19 which in turn illuminates the photocathode of photomultiplier tube 22. The output from tube 22 is amplified at 25 and passed on through low pass filter 26 to a diode gating circuit 27.

The output from tube 22 in the absence of excitation corresponding to such time as it can see a hole is customarily designated as "noise" and this noise characteristically is a relatively high frequency wave form. This random noise is at a much higher frequency than the fundamental frequency of the signal generated in response to the presence of a hole. This will be more readily appreciated when it is taken into account that the fundamental frequency of the pulse provided by a hole having a diameter of about $\frac{1}{32}$ of an inch in the inspected material with the material traveling at about 1,000 feet per minute is of the order of about 200 cycles per second. Thus, low pass filter 26 eliminates for all practical purposes the effect of the noise and its output is approximated by wave form 35 with the negative going pulse being indicative of the presence of a hole. For purposes of comparison, the wave form of the output from amplifier 25 is indicated above the latter in FIG. 3.

Diode gating circuit 27 provides complete isolation between filter 26 and amplifier 28 until an output pulse representative of a hole having a diameter at least as large as the smallest hole the apparatus is adjusted to detect, is passed on by the filter 26. Such an output pulse from the filter just exceeds the trigger voltage, that is the voltage required to render the diode gate circuit 27 conductive and it now passes a negative going pulse represented by wave form 51 of reduced amplitude to the amplifier 28 which is selected to provide high gain.

From amplifier 28 the signal is fed to a trigger circuit 29 having two stable states, one an "off" condition representative of the absence of a hole within the scanned area of the associated photoelectric units and the other an "on" condition representative of the presence of a hole in the scanned area. The trigger circuit provides an output which is fed to suitable utilization devices which may include audible or visual signal devices and such additional control apparatus as may be desired.

The second photoelectric unit 15a, as well as any additional such units as may be utilized, is provided with a separate amplifier 25a, filter 26a and diode gate 27a corresponding respectively to amplifier 25, filter 26, and diode gate 27, whereby there is provided a separate channel for each photoelectric unit ahead of amplifier 28 to the input circuit of which each is connected through suitable decoupling means as will be more fully described hereinafter. It is to be understood that when a third or any further number of photoelectric units are utilized a corresponding number of additional channels are also provided.

The output from each photoelectric unit is continuously monitored to avoid the possibility that one or more of the units may not function properly without its being promptly detected and corrected. To this end advantage is taken of the fact that in the absence of a hole there is a relatively high frequency noise output from each photomultiplier tube which fluctuates more or less about a D.-C. level determined, among other things, by the gain of the tube 22 and the amount of radiation received by it in the absence of a hole. Thus, monitoring circuit 30 connected in the channel of photoelectric circuit 15 and monitoring circuit 30a connected in the channel of photoelectric unit 15a, provide continuing indications of the presence of this noise output, absence of which would signal the inoperativeness of the associated photoelectric units.

The gain of each of the photoelectric units is readily varied as desired by adjustment of potentiometers inserted in the connection of each to the power supply, the latter being of conventional construction and is not shown. To facilitate such adjustment a microammeter 31 may be selectively connected by means of a switch 32 to receive the output from filters 26 and 26a.

Due to the high frequency noise suppression or attenuation provided by the filters 26, 26a the output from each is a narrow band A.-C. voltage on which the signal corresponding to a hole is superimposed as a negative going pulse as diagrammatically shown by the wave form 35. The adjustment is such that the minimum size hole to be detected provides a signal voltage of just enough amplitude to render diode gate 27 conductive.

Turning now to FIGURE 3, there is diagrammatically shown a preferred embodiment of the present invention which now will be described in detail. The photomultiplier tube 22 of each of the photoelectric units may be a tube having the standard designation 1P28 connected to a suitable power supply (not shown) having a −900 volt tap to which connection is made through a potentiometer 40, the movable tap of which is connected to the most negative electrode of the tube. As is well known, the final dynode of the tube 22 is connected through a suitable resistor to the B− supply or common ground.

The output or collector electrode is capacitively coupled to the input circuit of amplifier 25 and the output is taken across a suitable load resistor (not shown) as is conventional. Amplifier 25 and filter 26 being of conventional construction have already been described in sufficient detail hereinabove. Suffice it to say here that each is provided with appropriate power supply connections as is well understood. Both here and in connection with the components to be described, the cathode heater circuits have been omitted for simplicity.

A tap is provided as indicated at 42 between amplifier 25 and filter 26 from which connection is made through capacitor 43 to one side of a neon lamp 44 and also to the common junction of voltage dividing resistors 45 and 46. Capacitor 43 provides for D.-C. isolation between amplifier 25 and the neon lamp 44 across the latter of which resistors 45, 46 provide a voltage which is just below the breakdown voltage of the tube. The high frequency noise from photomultiplier tube 22 amplified at 25 is passed on by capacitor 43 with the result that a fluctuating voltage is superimposed on that across the lamp. The A.-C. noise signal with the steady D.-C. voltage are together sufficient to ignite the neon lamp 44. Once the lamp is thereby rendered conductive it becomes a low impedance shunt around resistor 46 and it thereby extinguishes itself. Thus a flickering glow is provided by lamp 44 and this is indicative of continued operation of the photomultiplier tube 22 even though there are no holes passing through the scanned area. It will be appreciated that the relatively high frequency noise which is applied as a signal to lamp 44 is not available when, for any reason, photomultiplier tube 22 is not operating.

As indicated by the wave form 35, the A.-C. component of the output signal from filter 26 is indicative of a hole in the sheet being inspected and this signal is applied to the cathode of diode tube 47, the bias voltage of which is established by voltage dividing resistors 48 and 49, the resistance values of which are in the ratio of about 30 to 1 to establish a suitable bias for the diode. Resistor 50 connected between the anode electrode of diode tube 47 and the B— supply is approximately twice the value of resistor 49 to provide proper diode operation. The resistors 48 and 49 establish a bias voltage across diode tube 47 such that in the absence of a negative going pulse corresponding to the presence of a hole in the area scanned by the photoelectric device the tube 47 is nonconductive. Conduction through tube 47 does not begin until its trigger voltage is exceeded by about 1/4 of a volt at which time the tube provides an output pulse corresponding to the input pulse but having a much smaller amplitude as indicated by wave form 51.

Diode tube 47 is capacitively coupled to the input circuit of amplifier 28 which comprises a pentode type tube 52. A relatively large resistor 53, of the order of about one million ohms, is connected between capacitor 54 and the control grid of tube 52 to provide for resistive decoupling of the several channels which are connected to the control grid of tube 52 as indicated at 55. It will be understood that each of the additional channels correspond to that just described and each includes a resistor corresponding to resistor 53 at the equivalent location as indicated by resistor 56. Pentode tube 52 and the remaining components of amplifier 28 are selected to provide a high degree of gain, an amplification factor of about 100 having proven to be satisfactory. The arrangement represented by amplifier 28 will be recognized as being conventional by those skilled in this art.

Trigger circuit 29 comprises a thyratron type tube 60 the cathode of which is connected to the common junction of voltage dividing resistors 62 and 69 across the B supply and the anode of which is connected to the B+ supply through the winding of a relay 65 which forms part of or controls the operation of utilization devices responsive to the output from tube 60. The coupling between the anode of tube 52 to the control circuit of tube 60 is effected through capacitor 63, resistors 61 and 64 in the grid-cathode circuit of the tube serving to establish the grid-cathode bias for the tube. A capacitor 66 is connected in shunt with resistor 61 as are also normally open contacts 67 governed by relay 65. The pole of contacts 67 is connected to the cathode of tube 60 through a relatively small resistor 68 while the opposite contact is connected directly to B+. Another set of normally open contacts 70, also governed by relay 65, are connected on one side through resistor 71 to the anode of tube 60 and on its opposite side through capacitor 73 to the B— supply. The back contact of contacts 70 is connected through resistor 72 to the B— supply. Thus, in its normally open condition, relay 65 deenergized, capacitor 73 is maintained discharged by small resistor 72.

When there is a hole in the area scanned by the photoelectric device, amplifier 28 provides a relatively high amplitude output pulse as indicated by wave form 75. This pulse is applied to the control electrode of the normally nonconductive tube 60 with the result that the latter is biased to conduct and it is converted from a very high impedance to a relatively low impedance. Normally a thyratron type tube such as tube 60, remains conductive until the flow of current in its plate-cathode circuit is interrupted because once ignited its control electrode is no longer capable of significantly influencing conduction through the tube. Relay 65 through other contacts controlled by it provides for operation of various utilization devices (not shown) and, through its normally open contacts, as will be now more fully described, switches the trigger tube 60 to its off condition. When tube 60 draws current, relay 65 picks up its contacts 67 and 70. Contacts 67 close to provide a relatively low impedance connection between the cathode of tube 60 and the B+ supply. At the same time the pole of contacts 70 shifts from its back to its forward contact and completes the connection between the winding of relay 65 through resistor 71 and capacitor 73 to the B— supply. Therefore, even though conduction through tube 60 is again cut off, current continues to flow through the winding of relay 65 for a time interval determined by the charging rate of capacitor 73 which is selected so that the contacts of relay 65 governing the utilization devices are shifted long enough to insure positive operation. As capacitor 73 charges up, conduction through the winding drops off until the relay releases and contacts 67 and 70 are returned to their open condition. Capacitor 73 now discharges through resistor 72. It will be understood that once contacts 67 open, the recovery time of thyratron 60 determines the required time constants of the circuit components including capacitor 66 which are selected so that the full voltage is not applied across tube 60 before the control electrode may once again stand off the start of a discharge through the tube.

As shown most clearly in FIGURE 3, microammeter 31 may be connected through switch 32 to receive the output provided by filter 26. Capacitor 80 provides for D.-C. decoupling with the result that only the A.-C. component of the output of tube 22 is passed on to the meter 31 through rectifier 81. Resistor 82 provides the D.-C. return path for the rectifier while capacitor 83 in shunt with the meter functions as an integrator. Thus the meter reading is representative of the gain of photomultiplier tube 22 and potentiometer 40 is adjusted until a meter reading is obtained which is just below that at which it is found tube 47 becomes conductive. This adjustment takes into account the fact that with materials such as paper which are not completely opaque more or less radiation will reach tube 22 depending on the extent to which the material is transparent. The less transparent the material being inspected the greater the gain in tube 22, and thereby the sensitivity of the apparatus, may be made by adjusting potentiometer 40.

As indicated hereinabove, means are provided for insuring that substantially the entire width of the material being inspected is illuminated and scanned even though the material may drift laterally while it is moving along its path. It will be appreciated that the photoelectric units such as photoelectric units 15 and 15a must be mounted so that they are always just shaded from the source 10 by the material 11 because if radiation from the source should fall directly upon a photoelectric unit a spurious hole signal would be initiated. Referring now to FIGURE 4, an opaque shutter 90 is pivotally mounted and is linked with servomotor 91 as indicated by the dashed line 92. While only one shutter is shown in FIGURE 4 it is to be understood that a duplicate arrangement is preferably provided adjacent to the opposite end of the source 10 which includes a second shutter controlled by a servomotor which in turn is controlled as will now be pointed out in connection with servomotor 91. An auxiliary photoelectric unit 93 which may be similar in all respects to photoelectric unit 15 is mounted side-by-side with the photoelectric unit, in this instance unit 15a, which is positioned to include within its field of view the adjacent edge of the material 11 being inspected. Thus photoelectric unit 93 is positioned so that it may just see a portion of the light source which material 11 shades with respect to the adjacent photoelectric unit 15a. The output from photoelectric unit 93 is fed through one winding 95 of a differential current relay 94 having a pivotally mounted armature. The second winding of relay 94 is connected to a source of reference current 97 and the contacts of the relay are connected to the control windings of the servomotor 91. It will be apparent that with equal current flowing in the windings 95 and 96, the armature of relay 94 is centrally positioned and its contacts are open. Whenever the current through winding 95 from photoelectric unit 93 is greater than or less than the current through winding 96 the armature of relay 94 is correspondingly swung to close one of its contacts to actuate servomotor 91 in a direction to rotate shutter 90 counterclockwise or clockwise. In operation, material 11 may drift laterally as much as an inch or more and, assuming a drift to the left as viewed in FIGURE 4, somewhat more radiation from source 10 will reach photoelectric unit 93. The increased current flow in winding 95 causes energization of servomotor 91 in a direction to rotate shutter 90 counterclockwise. As the shutter rotates counterclockwise, the amount of light reaching photoelectric unit 93 is reduced and the amount of current flowing in winding 95 is correspondingly reduced. As will be readily understood, operation of servomotor 91 ceases when the current flowing in the two windings 95 and 96 are once again in balance. When the material drifts to the right the operation is similar to the foregoing but in the opposite direction. As was pointed out hereinabove, the shutter and shutter control arrangement described is also provided at the left end of source 10 so that two independently controlled and movable shutters are preferably provided to monitor the position of the opposite edges of the material being inspected.

It is important to the attainment of trouble free operation that a steady source of radiation be provided such that the entire width of the scanned area is substantially uniformly illuminated. For this reason energization of the ultraviolet lamps 10a by a source of alternating current is not entirely satisfactory. On the other hand, when such lamps are normally energized by means of direct current they develop a dark spot which adversely affects the distribution of the light from the lamp with the result that they do not provide the highly desired uniform illumination. It has been found that these disadvantages are overcome by utilizing two banks of lamps with the lamps in one bank mounted in overlapping relation with respect to the lamps of the other bank as indicated in FIGURE 5. A voltage doubler indicated generally at 100 provides a source of unidirectional current across which leads 101 and 102 are connected. Two relays 103 and 104 each govern two sets of contacts which control the polarity of the current applied to the two banks of lamps in accordance with whether the respective relays are energized or deenergized. The windings of relays 103 and 104 are connected in series with cam-operated switches 105 and 106, respectively. As indicated, the switches 105 and 106 are mounted for operation by cams 107, 108, respectively, which are in turn driven by motor 109 through suitable reduction gears so that they rotate at a rate of about 1 revolution per hour. The dwell of each of the cams is such that switches 105 and 106 are each maintained closed through about 180° of revolution and then open for about 180°. As indicated cam 108 is offset with respect to cam 107 so that the operating points of the two switches are about 15 minutes apart. As shown, relay 103 is energized and conductors 110 and 111, connected to the lamps 10a in one bank are connected respectively to leads 101 and 102. Relay 104 being deenergized, the conductors 112 and 113, to the lamps in second bank, are connected respectively to leads 102 and 101. It will be recognized that with the arrangement just described one of the switches 105 and 106 will be actuated every 15 minutes with the result that every 30 minutes the polarity of the current fed to each bank of lamps is reversed but with the reversal in the direction of flow of current in one bank occurring 15 minutes after the reversal in the direction of flow of the current in the other bank. In this way the dark spot which would ordinarily result from the use of direct current is avoided and also the possibility that both banks of lamps might be switched at the same time.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. An apparatus for inspecting material moving along a path, comprising illuminating means including a source of ultraviolet radiation mounted on one side of said path for illuminating a predetermined area of said material, photoelectric means mounted on the opposite side of said path and in position to scan the area of the surface opposite to that illuminated and to receive radiation from said illuminating means which passes through a hole in said material, filter means interposed between the scanned area and said photoelectric means adapted to pass substantially only said ultraviolet radiation, said filter means including at least one filter element transparent to said ultraviolet radiation and substantially opaque to radiation of a longer wave length, said filter element having a coating on the surface thereof presented towards said photoelectric means, said coating when excited by said ultraviolet radiation being adapted to emit radiation for exciting said photoelectric means, and means responsive to said photoelectric means for providing a signal when a hole in said material passes through said scanned area.

2. An apparatus for inspecting material moving along a path, comprising illuminating means including a source of ultraviolet radiation mounted on one side of said path for illuminating a predetermined area of said material, photoelectric means mounted on the opposite side of said path and in position to scan the area of the surface opposite to that illuminated and to receive radiation from said illuminating means which passes through a hole in said material, shutter means mounted adjacent to the opposite edges of said path and movable between two extreme positions into more or less overlapping relation between the opposite ends of said illuminating means and the edges of said path, second photoelectric means mounted on said opposite side of said path for receiving radiation from one end of said illuminating means past one edge of the material moving along said path, means responsive to said second photoelectric means for shifting said shutter means between its said two extreme positions and thereby maintain substantially constant the amount of radiation reaching said second photoelectric means past the edge of said material, whereby the illuminated area is shifted transversely of said path when said material moves transversely with respect to said path, and means responsive to said first photoelectric means for providing a signal when a hole in said material passes through said scanned area.

3. An apparatus for inspecting material moving along a path, comprising illuminating means including at least two lamps on one side of said material for illuminating with ultraviolet radiation a predetermined area of said material, means for coupling said lamps to a source of unidirectional electromotive force and including means for alternately reversing the direction of current flow through said lamps, first photoelectric means mounted on the opposite side of said material and in position to scan the area of the surface opposite to that illuminated and to receive radiation from said illuminating means which passes through a hole in said material, optical filter means interposed between the scanned area and said first photoelectric means and including a plurality of filter elements mounted in succession between said scanned area and said first photoelectric means, the filter element closest to said scanned area being transparent to said ultraviolet radiation and substantially opaque to radiation of a longer wave length and having a coating on the surface thereof presented towards said first photoelectric means, said coating being adapted for excitation by said ultraviolet radiation to emit radiation for exciting said first photoelectric means, yellow and blue filter elements juxtaposed between said coating and said photoelectric means, shutter means mounted adjacent to the opposite edges of said path and movable between two extreme positions into more or less overlapping relation between the opposite ends of said illuminating means and the edges of said path, second photoelectric means mounted on said opposite side of said path for receiving radiation from one end of said illuminating means past one edge of the material moving along said path, means responsive to said second photoelectric means for shifting said shutter means between its said two extreme positions and thereby maintain substantially constant the amount of radiation reaching said second photoelectric means past the edge of said material, gating means, means coupling said gating means with said first photoelectric means and including electronic filter means adapted to pass relatively low frequency impulses and adapted to substantially attenuate high frequency impulses, means for normally maintaining said gating means nonconductive and in response to an impulse of a predetermined minimum amplitude passed by said electronic filter means for rendering said gating means conductive, trigger means including a gas discharge device for providing an output representative of a hole passing through said scanned area, high gain amplifier means coupling the input circuit of said gas discharge device with said gating means and for amplifying and passing on to the former impulses passed by the latter, relay means connected in the output circuit of said gas discharge device, means including contacts governed by said relay means in response to energization of said gas discharge device for deenergizing the latter, and means for maintaining said relay means energized for a predetermined time interval following deenergization of said gas discharge device.

4. An apparatus as set forth in claim 3, wherein means are coupled with said first photoelectric means for measuring the time integral of the output of said first photoelectric means and thereby provide a representation corresponding to the signal level of the output thereof, and means for adjusting the signal level of said first photoelectric means to a value such that said gating means is maintained nonconductive in the absence of a hole of at least a predetermined size in the scanned area.

5. An apparatus as set forth in claim 3, wherein means including a glow lamp are coupled to said first photoelectric means ahead of said electronic filter means and means for energizing said glow lamp in response to relatively small amplitude impulses in the output of said first photoelectric means.

6. An apparatus for inspecting material moving along a path, comprising illuminating means including a source of ultraviolet radiation mounted on one side of said path for illuminating a predetermned area of said material, filter means mounted on the opposite side of said path and in position to scan the area of the surface opposite to that illuminated and to receive radiation from said illuminating means which passes through a hole in said material, said filter means including first and second filter elements, means interposed between said filter elements adapted when excited by said ultraviolet radiation to emit further radiation, said first filter element being transparent to said ultraviolet radiation, said second filter element being transparent to said further radiation, photoelectric means mounted on the side of said filter means away from said path responsive to and adapted to receive radiation passed through said second filter element, and means responsive to said photoelectric means for providing a signal when a hole in said material passes through said scanned area.

7. An apparatus for inspecting material moving along a path, comprising illuminating means including a source of ultraviolet radiation mounted on one side of said path for illuminating a predetermined area of said material, filter means mounted on the opposite side of said path and in position to scan the area of the surface opposite to that illuminated and to receive radiation from said illuminating means which passes through a hole in said material, said filter means including a first filter element transparent to said ultraviolet radiation and substantially opaque to radiation of a longer wave length, said filter element having a coating on the surface thereof away from said path adapted when excited by said ultraviolet radiation to emit radiation, a second filter element juxtaposed to said coating and transparent to radiation emitted by said coating, photoelectric means mounted on the side of said filter means away from said path responsive to and adapted to receive radiation passed through said second filter element, and means responsive to said photoelectric means for providing a signal when a hole in said material passes through said scanned area.

8. A device for detecting holes in a material that is substantially opaque to electromagnetic energy of certain wave lengths substantially in the ultraviolet band in the vicinity of 2,537 Angstroms, comprising a source of electromagnetic energy positioned on one side of said material for producing electromagnetic energy having at least one of said certain wave lengths, a detecting device positioned on the other side of said material to receive electromagnetic energy from the direction of said source and to produce an electrical signal in response thereto, and an emitter positioned between said source and said detecting device for emitting electromagnetic energy in response to energy of said certain wave lengths, said emitted energy having wave lengths to which said detecting device is sensitive.

9. An apparatus for inspecting material moving along a path, comprising a source of ultraviolet radiation mounted on one side of said path for illuminating said material at a predetermined area in the path of travel thereof; a detector mounted on the opposite side of said path in position to receive radiation from said source which passes through a hole in said material, said detector including an ultraviolet filter for receiving and transmitting ultraviolet radiation from said source, a phosphor layer positioned to receive ultraviolet radiation passing through said filter and emit radiation in substantially the visible spectrum in response thereto, filter means having a transmission band substantially in the visible spectrum positioned to receive radiation emitted by said phosphor layer, and photoelectric means positioned to receive radiation passing through said filter means and respond thereto; and means responsive to said photoelectric means for providing a signal when a hole in said material passes through said predetermined area.

References Cited in the file of this patent

UNITED STATES PATENTS

| | | | |
|---|---|---|---|
| 2,429,331 | Sachtleben | Oct. 21, | 1942 |
| 2,490,011 | Bird | Dec. 6, | 1949 |
| 2,551,650 | Urbach | May 8, | 1951 |
| 2,563,274 | Rendel | Aug. 7, | 1951 |
| 2,864,996 | Linderman | Dec. 16, | 1958 |
| 2,866,376 | Cook | Dec. 30, | 1958 |
| 2,878,388 | Bergson | Mar. 17, | 1959 |
| 2,902,605 | Wallack | Sept. 1, | 1959 |
| 3,026,415 | Lake et al. | Mar. 20, | 1962 |
| 3,052,405 | Woodland | Sept. 4, | 1962 |
| 3,056,032 | Cannon | Sept. 25, | 1962 |